US008179802B2

(12) United States Patent
Zave

(10) Patent No.: US 8,179,802 B2
(45) Date of Patent: May 15, 2012

(54) METHOD AND APPARATUS FOR MANAGING AUDIO CONTENTION IN NETWORKS

(75) Inventor: Pamela Zave, Chatham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 405 days.

(21) Appl. No.: 12/170,053

(22) Filed: Jul. 9, 2008

(65) Prior Publication Data

US 2010/0008232 A1    Jan. 14, 2010

(51) Int. Cl.
*H04L 12/26* (2006.01)

(52) U.S. Cl. ........ 370/241; 370/242; 370/230; 370/414; 370/352

(58) Field of Classification Search .................. 370/216, 370/241, 242, 252
See application file for complete search history.

(56) References Cited

U.S. PATENT DOCUMENTS

| | | | |
|---|---|---|---|
| 5,463,629 A * | 10/1995 | Ko | 370/463 |
| 6,404,878 B1 * | 6/2002 | Jackson et al. | 379/221.01 |
| 6,430,417 B1 * | 8/2002 | Raith et al. | 455/466 |
| 6,438,216 B1 * | 8/2002 | Aktas | 379/88.01 |
| 6,778,560 B1 * | 8/2004 | Zave et al. | 370/522 |
| 6,842,437 B1 * | 1/2005 | Heath | 370/322 |
| 2002/0021711 A1 * | 2/2002 | Gummalla et al. | 370/464 |
| 2002/0082018 A1 * | 6/2002 | Coskun et al. | 455/439 |
| 2005/0047389 A1 * | 3/2005 | Bond et al. | 370/351 |
| 2007/0211702 A1 * | 9/2007 | Doradla et al. | 370/356 |
| 2008/0101338 A1 * | 5/2008 | Reynolds et al. | 370/352 |
| 2008/0304448 A1 * | 12/2008 | Hosein | 370/329 |

* cited by examiner

*Primary Examiner* — Ricky Ngo
*Assistant Examiner* — Rasheed Gidado

(57) ABSTRACT

A method and an apparatus for managing an audio contention are disclosed. For example, the method receives a request by a device, and enters into a first state by the device, wherein the first state allows the device to use an audio channel in an upstream direction, wherein the device in the first state determines at least one of: a failure outcome for the request, a success outcome for the request or a continue outcome for the request.

12 Claims, 11 Drawing Sheets

METHOD AND APPARATUS FOR MANAGING AUDIO CONTENTION IN NETWORKS

The present invention relates generally to communication networks and, more particularly, to a method for managing audio contention when services are provided on packet networks such as Voice over Internet Protocol (VoIP) and Service over Internet Protocol (SoIP) networks.

BACKGROUND OF THE INVENTION

Today's communications networks are software controlled. For example, Internet Protocol (IP) based networks such as Voice over Internet Protocol (VoIP) networks are software controlled. Functionalities can be added in the communications software using increments called features. As more and more features are added, the software has become overwhelmingly complex. Providing these new features into a plurality of software modules introduces the problem of contention as these independent software modules interact with each other.

SUMMARY OF THE INVENTION

In one embodiment, the present invention discloses a method and apparatus for managing audio contention among various features. For example, the method receives a request by a device, and enters into a first state by the device, wherein the first state allows the device to use an audio channel in an upstream direction, wherein the device in the first state determines at least one of: a failure outcome for the request, a success outcome for the request or a continue outcome for the request.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for managing audio contention when services are provided on packet networks, e.g., Voice over Internet Protocol (VoIP) networks. Although the present invention is discussed below in the context of VoIP networks, the present invention is not so limited. Namely, the present invention can be applied in other packet networks where various features are provided using modular software, e.g., cellular networks.

Figure 1:
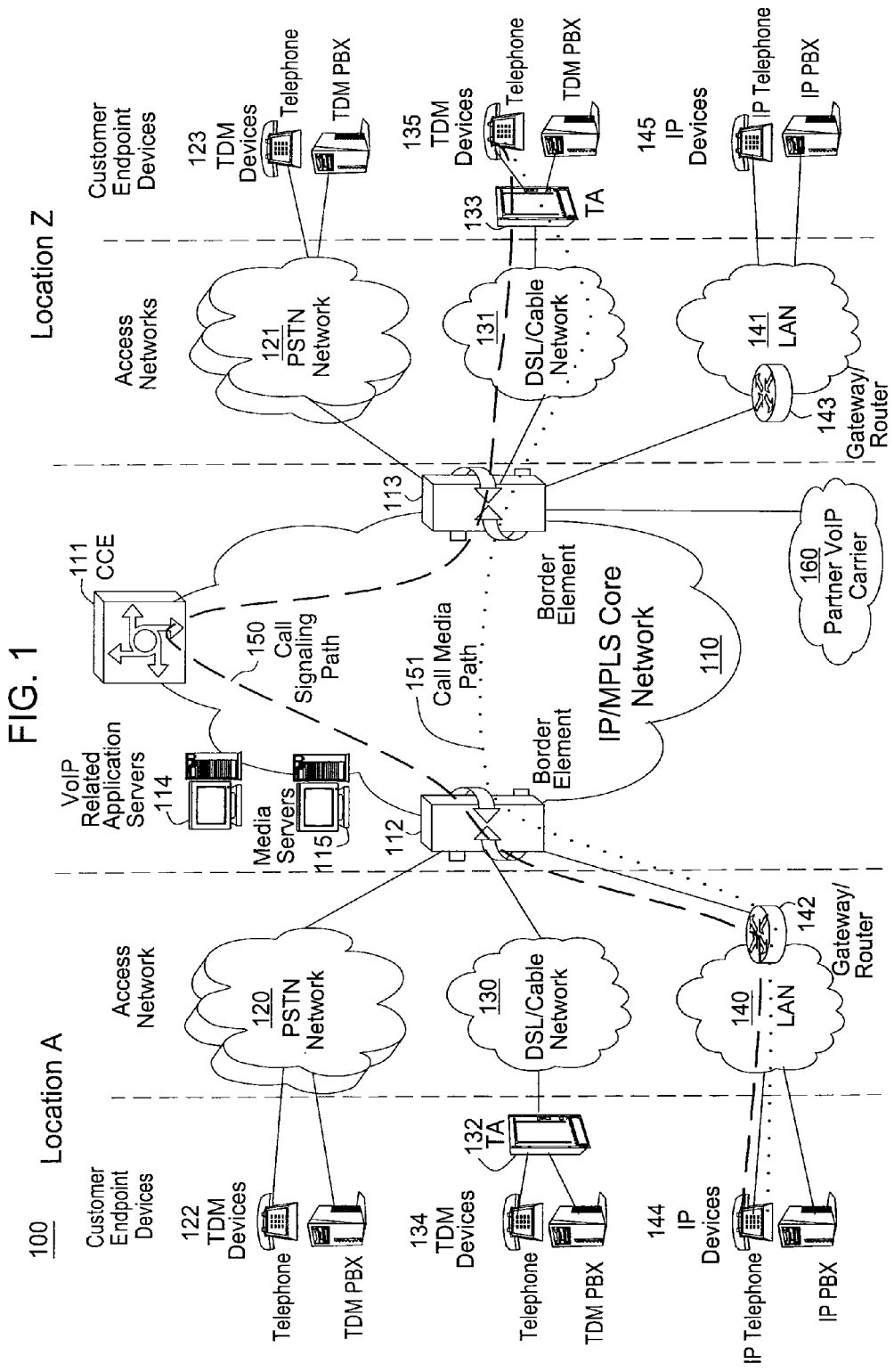
FIG. 1 illustrates an exemplary network related to the present invention.

To better understand the present invention, FIG. 1 illustrates an example network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. call waiting, translation of an E.164 voice network address into an IP address, etc. The CCE forwards the signaling towards the application servers and receives responses. The application server remains in the signaling path unless it has no mid-call function. Although FIG. 1 shows few servers and a CCE, those skilled in the art realize, a call may involve many application servers and multiple call control elements.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. For example, a customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup-signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call, CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the called party accepts the call at location Z, a call acknowledgement signaling message, such as a SIP 200 OK response message if SIP is used, is sent in the reverse direction back to the CCE 111. After the CCE 111 receives the call acknowledgement message, it will then send a call acknowledgement-signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. FIG. 1 shows an example of a call with the signaling path and the media path being different. That is because the exemplary call that has been setup between the two endpoints doesn't need the CCE to remain in the media path in this particular instance. In other examples, a call may be setup using multiple CCEs and the CCEs may remain in the signaling path.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which packets are transported and services are provided on networks such as VoIP networks. Although the above network is illustrated using a SIP protocol, any protocol such as SS7, Distributed Feature Compositional (DFC) protocol and the like may be used.

Customers may access communications services using a variety of endpoint devices, e.g., telephones, personal computers, etc. For example, the user interface of a personal computer is infinitely extensible. That is, new features may be incorporated into the customer endpoint devices, as these devices come into the market. However, for features and services implemented outside endpoint devices, audio signaling is the ubiquitous signaling method of choice. The reason is that audio signaling requires no assumptions about endpoint devices and may be used with multiple generations of technologies. For example, most users are still talking on ordinary telephones, and are still connected (even to VoIP users) through the Public Switched Telephone Network (PSTN). In addition, audio user interfaces are highly portable, user-friendly, do not require the use of eyes, and are often hands-free. Hence, the features in audio user interfaces may need to interact the same way regardless of the type of network, e.g., IP network, PSTN, etc.

In one embodiment, the current invention provides a method for managing audio contention in networks, e.g., VoIP networks. For example, the audio contention may occur among services that use audio signaling before a call is successfully established. Audio signaling refers to the use of an audio channel for signaling and/or user-interface purposes. For example, audio signaling is used for progress tones, announcements, voice prompts, touch-tone detection, or voice recognition for control purposes. Some examples of services that use audio signaling are Do Not Disturb, recording of voice mail, sequential find me, parallel find me, answer confirm, collect call, selective call forwarding, click-to-dial and the like.

In one embodiment, the current method assumes that feature modules are composed in a pipes-and-filters configuration, with feature modules being the filters, and instances of the call protocol being the pipes. For example, Distributed Feature Composition (DFC) is a pipes-and-filters architecture for VoIP networks. The pipes-and-filters approach has since been adopted for the SIP Servlet architecture. Typical circuit-switched telecommunication networks do not have a pipes-and-filters architecture, so the method presented here is applicable for packet networks, e.g., IP networks.

When features use audio signaling, and are assembled in a pipes-and-filters configuration, there is a potential for undesirable feature interactions. The current invention provides a method for managing the audio feature interactions such that undesirable interactions (e.g., contentions) are eliminated.

The present invention provides an algorithm or method to be executed by feature modules (e.g., deployed in application servers and endpoints) such that the undesirable interactions are eliminated. It is also important to note that the compositional pattern of signaling provided below is applicable regardless of how many features are active.

The protocol signaling for a call begins when a caller's endpoint device sends a callee's endpoint device a request for a connection. If the signaling eventually reaches the callee's endpoint device, the callee's endpoint device sends a response, which is a success or a failure. If the response is a failure, then the call is over. The response for the failed call may include a modifier indicating the reason for the failure. If the response is a success, then there is an audio connection between the caller and the callee.

Figure 2:
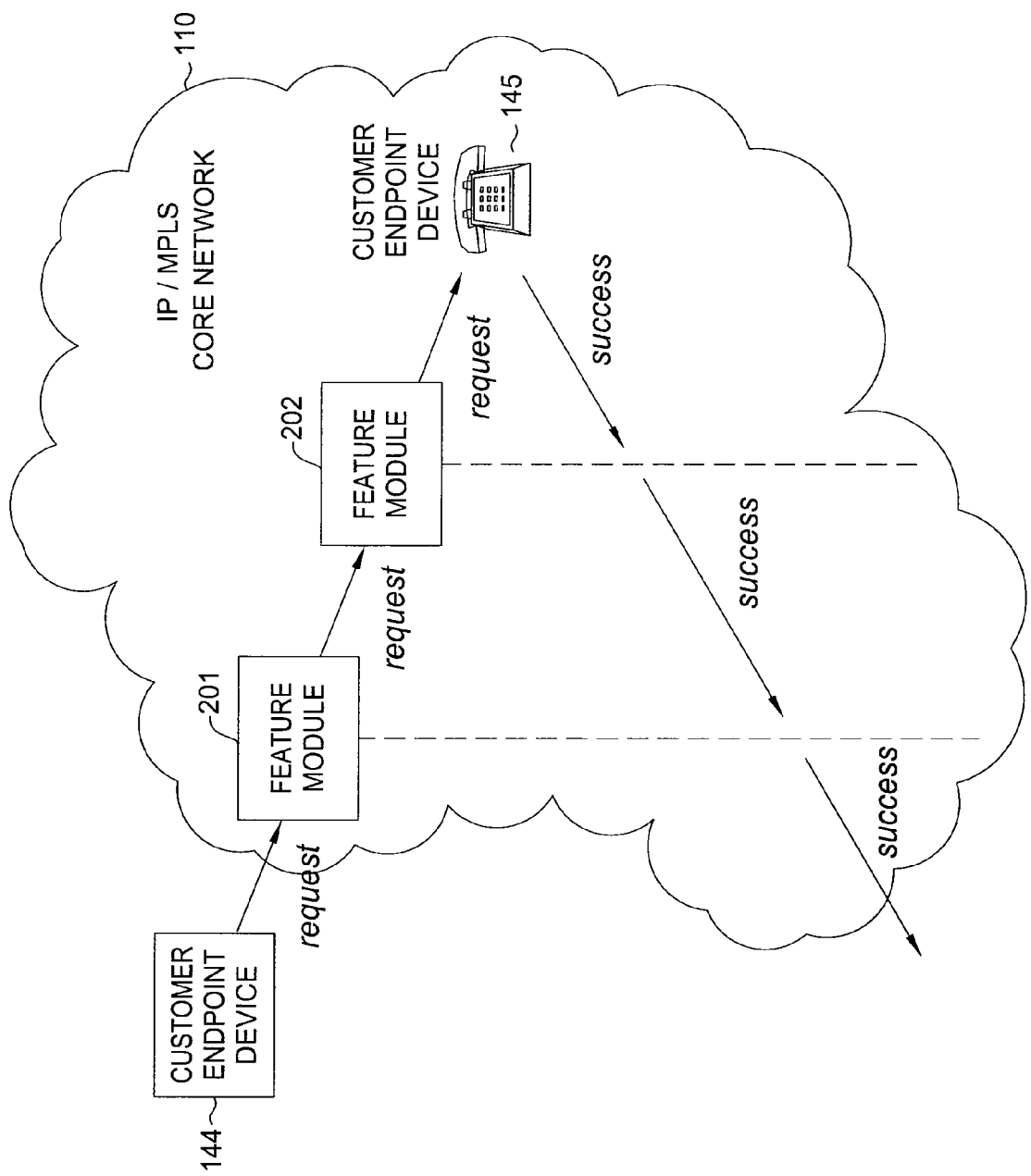
FIG. 2 illustrates an exemplary realization of the signaling protocol in a pipes-and-filters architecture.

FIG. 2 illustrates an exemplary pipes-and-filters architecture 200 using the signaling protocol of the present invention. For example, a caller initiates a call using customer endpoint device 144. The call is propagated towards a callee's customer endpoint device 145, through a network, e.g., an IP/MPLS core network 110. The request is handled in the IP/MPLS core network 110 by a chain of feature modules (FMs) 201 and 202. The chain of feature modules is assembled dynamically by a routing algorithm that routes each request in the chain to the appropriate module. Note that the routing algorithm is used without alteration and is not a subject of the current invention. The request traverses from the customer endpoint device 144 towards customer endpoint device 145 via feature module 201 and feature module 202. The response (e.g. success) propagates from the customer endpoint device 145 towards customer endpoint device 144 via feature module 202 and feature module 201.

When an endpoint device initiates a request, the request is routed to the next feature module that applies to it. In one embodiment, the feature module is an object, and unless otherwise noted, it is a new instance of its class. If there are no more features that apply to the request, then the request is routed to an endpoint device. As a request travels from one feature module to the next, it creates a two-way signaling channel between the sending and receiving feature modules. An observer of this signaling channel would see a complete and self-contained instance of the call protocol. These individual calls are linked through the feature modules to generate the end-to-end call behavior.

When none of its functions are triggered, a feature module behaves transparently. For example, a feature module behaves transparently until it receives a signal or a time-out that triggers the feature it provides. Transparent signaling behavior of a module with two calls, one incoming and one outgoing, consists of sending each received signal out on the other call. For the example in FIG. 2, all the feature modules are behaving transparently. The success response from the customer endpoint device 145 is propagated backward through the chain of calls towards the customer endpoint device 144.

When a feature module is not behaving transparently, it can modify, delay, or absorb any signal that it receives. The feature module can also generate new signals. The only constraint is that the signals exchanged on each signaling channel between two adjacent modules must form a legal and complete instance of the call protocol. Once triggered, the feature module may query databases, use audio-processing, or manipulate signaling. It may return to quiescence (transparency). If it does, it may be triggered again. Thus, over its lifetime, a feature module alternates between active and inactive (transparent) phases. Each active phase is triggered by a received signal or time-out. The requesting end of a call instance can send an end signal to end the call at any time. The accepting end can send an end any time after sending success.

Those skilled in the art would realize that one or more additional handshaking signals may be needed to set up the two-way signaling channel and to acknowledge that the signaling channel has been torn down at the end of a call. These additional handshaking signals are not affected by the current method for managing audio feature interactions.

Note that the signaling chain above may be described in terms of directions. If directions are referred, a downstream signaling direction refers to signaling towards the callee. For example, requests travel downstream. An upstream signaling direction refers to a signaling direction towards the caller. For example, success and failure signals travel upstream.

In one embodiment, feature modules may be the sites of forks and joins. A feature module may be providing a conferencing feature, a three way calling feature, etc. The configuration of a feature module may then be a graph or a linear chain.

In order to clearly illustrate the teachings of the current invention, the method first assumes that a single two-way audio channel accompanies each signaling channel. Also, assume that the audio channel passes through feature modules, as does the signaling channel. The audio channel may then be manipulated by feature modules. A feature module may perform an audio signal processing, e.g., generating a progress call, playing an announcement, detecting a touch-tone, etc.

The audio signaling is highly customized for the feature using it. For example, a Call Forwarding on Request (CFR) feature redirects a request to one of a set of addresses. For example, it may employ a user interface in which the caller uses touch tones to answer a question, e.g., "How may we direct your call?" The user interface may be implemented by a VoiceXML script specifying the menu of prompts.

Progress tones such as ringback and busytone are different from interactive voice-response interfaces because they are often standardized. In one embodiment, progress tones can be implemented by endpoint devices, so that feature modules are not required to generate progress tones except to send signals to the endpoints. Thus, in one embodiment, endpoint devices may be regarded as feature modules with hardware that may generate progress tones.

Figure 3:
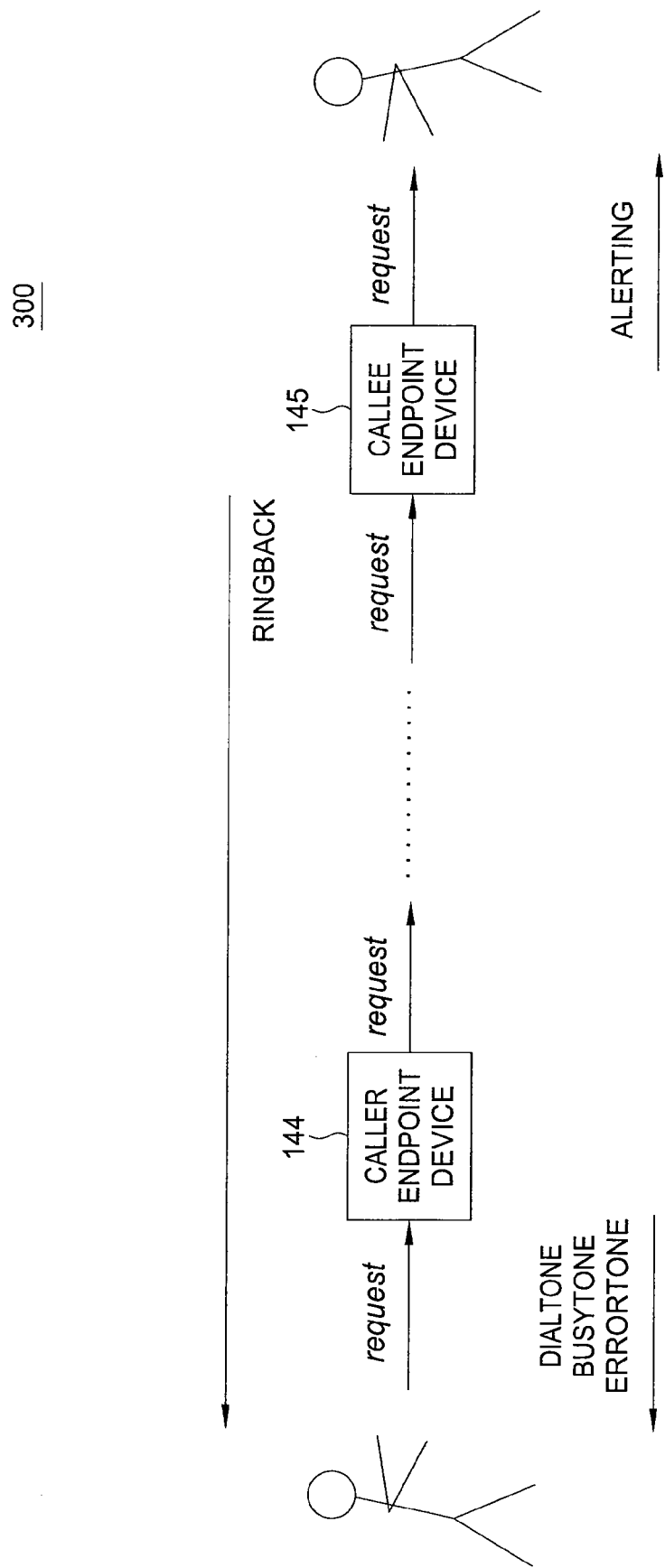
FIG. 3 illustrates an exemplary pair of endpoint devices that generate progress tones.

FIG. 3 illustrates an exemplary pair of endpoint devices that generate progress tones. Caller endpoint device 144 may generate dialtone, busytone and errortone. Callee endpoint device 145 may generate a progress tone for ringback and also for alerting the called party when a call is received. Note that FIG. 3 makes no distinction between requests that are user actions (such as picking up a handset) and requests that travel through the network. It also makes no distinction between alerting through the handset speaker and alerting through the air, by a bell or other mechanism.

In one example, an endpoint feature module may receive a request from a user. The feature module then plays the role of a caller. It may play a dialtone upstream (toward the user), then send the request downstream (to the network). If the outcome of the request is a failure signal from downstream, it may play a busytone or an errortone upstream, until the user does something to stop the tone.

In one example, an endpoint feature module may receive a request from the network. The feature module then plays the role of a callee. It may alert the user downstream and play ringback upstream, until the request is aborted or a user accepts the call.

In one embodiment, the current method regards ringback as being played by the callee end for two reasons. The first reason is that ringback is the echo of alerting. The second reason is that the callee endpoint device is an appropriate place to control ringback (as shown below). Note that the location of an audio signaling is not necessarily its location in an implementation. That is, a feature module may perform the audio signaling itself or via a media server. For ease of understanding, the current method is described for the case of an audio signaling being performed in the feature module. However, the method is equally applicable for feature modules that use media servers.

Feature modules in a pipes-and-filters configuration are programmed independently and run concurrently with respect to each other. Undesirable interactions may occur in two ways. First, an audio contention among multiple feature modules may occur when more than one feature module attempts to use the audio signaling at the same time. Second, an endpoint device feature module (caller or callee) and another feature module may interact producing a reversed or sequential progress tone. In order to clearly understand the current invention, the two types of undesirable interactions are first described.

When two or more feature modules attempt to use the same audio signaling, an audio contention is created. Audio contention among multiple feature modules is always an undesirable feature interaction. It will likely result with at least one of the feature modules not working as expected.

In one example, an audio contention occurs when two or more feature modules use audio signaling to communicate with the caller before sending a request to an endpoint. For example, a CFR (described above) is a feature that may use the audio signaling to communicate with the caller prior to forwarding a request towards the intended endpoint. Another example of such feature is Do Not Disturb (DND). DND may play an announcement to the caller that the callee does not wish to be disturbed, and send a prompt to the caller asking if the call is urgent. If the call is urgent, DND may send the request to an endpoint despite the callee's default preference. When both the CFR and DND feature modules apply to a caller's request, it is important to ensure that both feature modules do not attempt to use the audio channel to the caller simultaneously.

In another example, an audio contention occurs when forking in SIP reaches multiple features simultaneously, some of which expecting to use the audio channel to the caller. At most one of them can be connected to the caller; this means that some of the feature modules may not work as expected.

The second undesirable interaction occurs when an endpoint device feature module and some other feature module interact producing a reversed or sequential progress tone. For example, a caller may be a subscriber to a Click-to-Dial (C2D) feature. When the caller triggers the C2D service via a Web server, the C2D feature module first places a call to the clicker's phone. Once the clicker has answered, C2D places a call to the clicked address. That is, the Click-to-Dial feature module makes two outgoing calls in the order described. Because of the C2D feature being activated, the user on the clicker end should hear progress tones such as ringback and busytone to indicate the status of the second call, even though the clicker's phone was reached in the role of a callee. These are called reversed tones, because they reverse the expectation that ringback and busytone are heard only by callers.

In another example, a person who is already talking to another person may try to add a third person by activating a Three-Way Calling (3WC) feature. This person (the activator) should hear progress tones to indicate the status of the third call. If the activator was originally the caller, then these are sequential tones, because the caller has already made one successful call, and heard the tones for it as it was being set up. If the activator was originally the callee, then these are reversed tones.

Reversed or sequential tones are desirable from the standpoint of the users, because they provide a complete and familiar user interface for many features in many different situations. However, if the endpoint device feature modules do not support these reversed or sequential tones, the reversed or sequential tones produce an undesirable interaction with endpoint device feature modules. For example, the expectation of the SIP architecture is that endpoint devices will perform all tone generation. However, SIP signaling constraints do not allow devices to generate reversed or sequential tones. This is because the standardized SIP signals that would cause an endpoint to generate progress tones (e.g. 180 for ringback, failure response for busytone or errortone) are not allowed in reversed or sequential situations.

The current method manages audio contention in networks by preventing the audio contention from occurring in the first place. First, a method for eliminating audio contention in a restricted context is presented. Then the context of applicability will be widened.

Consider the handling of a single request. In the pipes-and-filters architecture, the request stimulates assembly of a dynamic chain of feature modules. Consider these chains, with two restrictions: (1) No module can have more than one continuation request at a time, and (2) All continuation requests sent by a module are sent for the purpose of helping its incoming request succeed. This means that once the feature module has sent a success signal upstream, it cannot send any additional requests.

If all the feature modules in the chain obey the convention, then one can be sure that there is no audio contention. The essence of the convention is that a request signal traveling downstream, followed by a success signal traveling upstream, may be regarded as a token that is possessed by no more than one feature module at once. If a feature module performs audio signaling only when it has the token, then there can be no contention.

Figure 4:
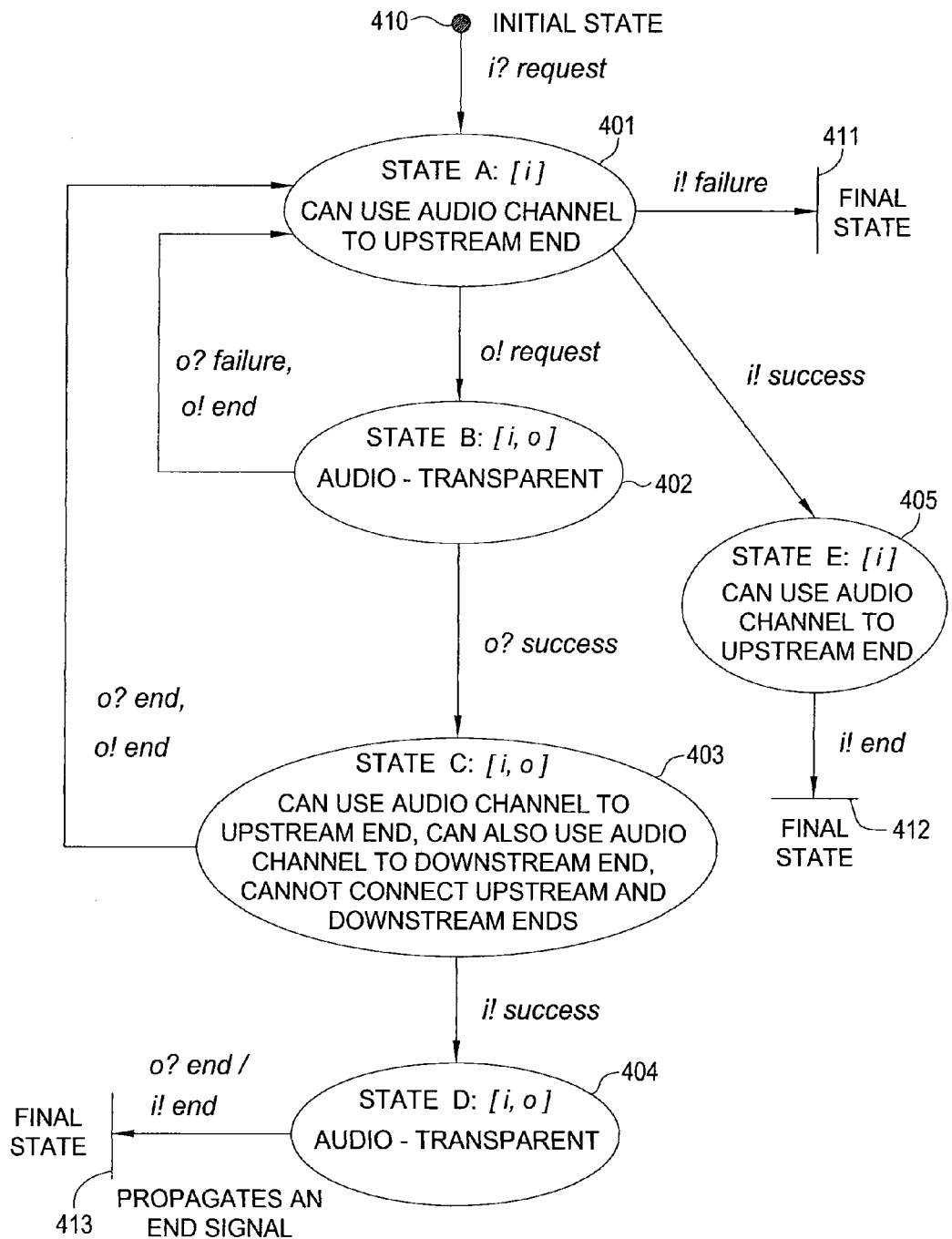
FIG. 4 illustrates a nondeterministic meta-program that obeys the convention.

FIG. 4 illustrates a nondeterministic meta-program 400 that obeys the above convention. The meta-program 400 contains an initial state 410, final states 411-413, and five intermediate states 401-405. The intermediate states 401, 402, 403, 404 and 405 are labeled as State A, State B, State C, State D and State E, respectively. A feature module may be in one of the intermediate states, the initiate state or a final state. A feature module exits its current state and enters another state either when it receives a request or a response, or it initiates a request or a response.

The letters i and o in meta-program 400 represent the ports of the incoming and current outgoing call, respectively. "!" and "?" represent sending and receiving a signal, respectively. For example, "i?request" represents receiving a request on the port of the incoming call. Similarly, "o!request" represents sending a request on the port of the outgoing call. Each state in meta-program 400 is labeled with a letter and the calls that exist in while in that state, which may be [i] or [i,o]. The initial state 410 is shown as a black dot. The final states 411-413 are shown as bars. Commas separate independent transition labels with the same source and sink states. The label o?end/i!end means that the module propagates an end signal received from downstream.

In addition to the transitions shown explicitly in the FIG. 4, in any state except in the initial state 410, the program may receive an end signal from the incoming call. In response, the program must end the outgoing call (if any) and terminate.

If a feature program is in state A or E of the meta-program, its activity may include using the audio channel through i to communicate with the user connected to the upstream end of the audio channel.

If a feature program is in state C of the meta-program, its activity may include using the audio channel through o to communicate with the user connected to the downstream end of the audio channel. Its activity may also (and simultaneously) include using the audio channel through i to communicate with the caller. It must not, however, connect the upstream and downstream ends transparently. Caller and callee should not be allowed to talk until the success signal has traveled through all the feature modules that might affect it or be affected by it.

If a feature program is in state B or D, it must be transparent with respect to audio, which means that the audio channels associated with i and o are connected to each other.

The meta-program above is nondeterministic because it makes room for many possible behaviors of programs that refine it. For example, in state A, a program may choose to leave the state by sending a request, success, or a failure signal.

It should be noted that if a feature module is in state A, then all feature modules upstream of it are in state B, and are therefore audio-transparent. This is true because all the feature modules upstream have sent a downstream request, and have not yet received a success signal from downstream. Furthermore, if a feature module is in state C, then all feature modules upstream of it are in state B, and are therefore audio-transparent. If a feature module is in state C, then all feature modules downstream of it are in state D or E. The downstream feature modules are either audio-transparent, or represent the audio endpoint of the chain. This is true because the downstream feature modules have already sent a success signal upstream.

These two observations guarantee the absence of contention when a feature module uses the audio channel in states A or C. The use of the audio channel in state E is discussed below using a parallel ringing example.

Parallel Ringing (PR) refers to a type of service provided by a feature module, wherein the feature module first receives a request for a person who subscribes to its services, and then it sends simultaneous outgoing requests to several device addresses where the person might be reached. That is, the subscriber for the PR service may be contacted via one of many devices. For example, a feature module for a PR may ring a person's cell phone, pager, wire based phone, etc. simultaneously. If one of the outgoing requests succeeds, then the feature module connects that device to the caller and ends the other outgoing requests.

Figure 5:
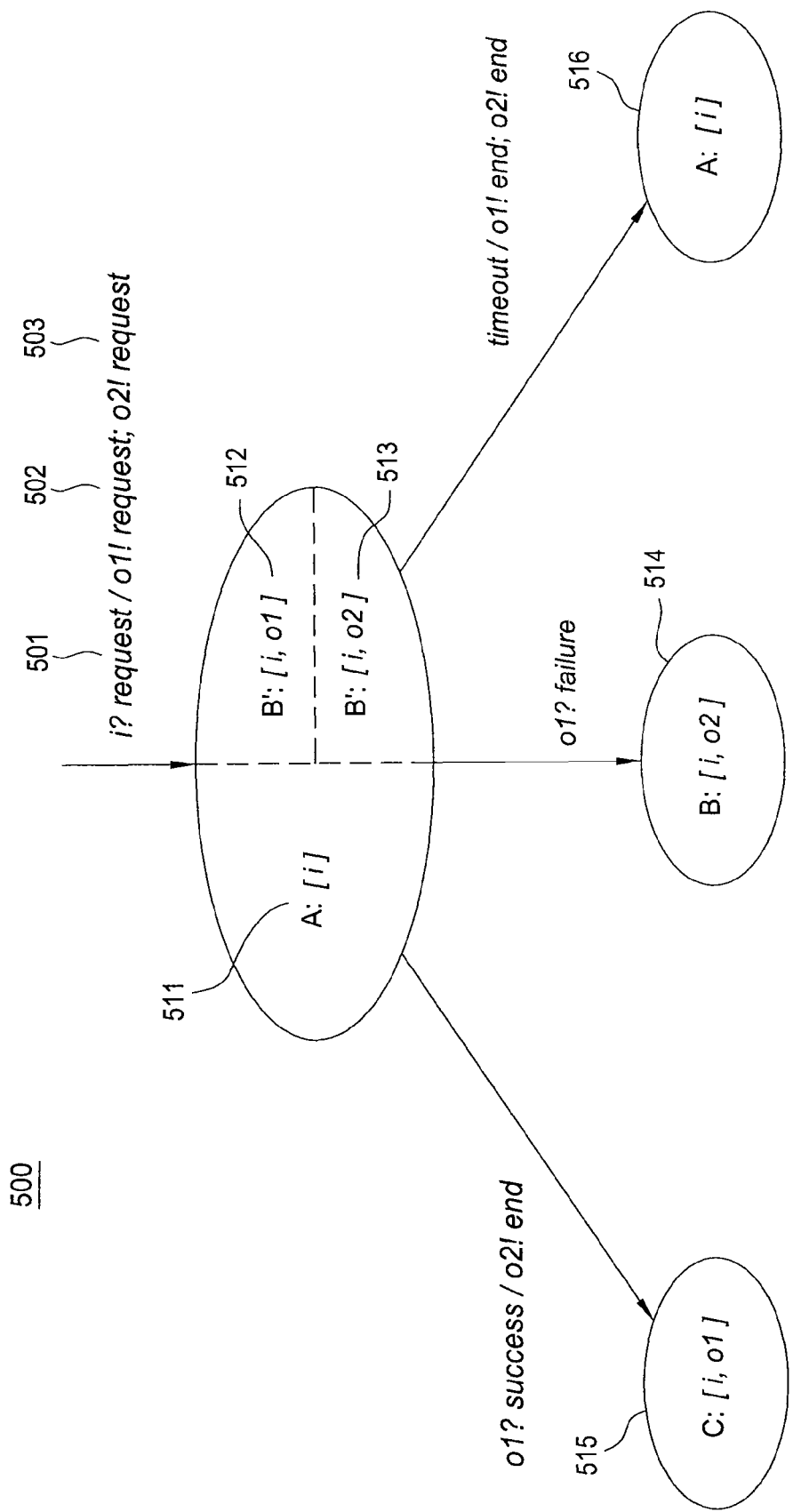
FIG. 5 illustrates a fragment of the meta-program for Parallel Ringing (PR)

To manage audio contention as described above, it is necessary to regard a feature module for parallel ringing in one of the above states, as playing two roles: as the end of one chain and as the beginning of some number of other chains. FIG. 5 illustrates a fragment of the meta-program 500 for Parallel Ringing (PR), showing the special state and its context.

On receiving an incoming request 501, a PR feature module sends two outgoing requests 502 and 503. Note that the meta-program may send any number of outgoing requests, where two outgoing requests as shown in FIG. 5 are used only for ease of illustration. The PR feature module enters a state divided into three substates, each corresponding to the state of one of the three chains: one chain to the caller and two chains towards two callee devices.

For the chain to the caller, the PR feature module remains in substate A and generates ringback upstream, as shown in 511. From the viewpoint of this chain, the outgoing requests do not exist. Similarly, with respect to the two parallel chains initiated by the PR feature module, the PR feature module is in substate B' shown in 512 and 513. The state B' in 512 or 513 is exactly like state B except that there is no true upstream endpoint, and any downstream module that attempts to communicate with the caller will get no response. This feature interaction exists because the caller's audio channel cannot be shared among the parallel outgoing requests. Any subsequent action results in the disappearance of at least one of the parallel chains. After the disappearance of one downstream chain, the upstream and remaining downstream chain may be merged. Merging the two remaining chains, results in state B or C, as illustrated in 514 and 515, respectively. After the termination of both chains due to an internal timeout, the PR feature module has no downstream chain and is in state A, as shown in 516. The results (failure or success) of the second outgoing request 503 are not shown, but they are symmetric to the results of the first outgoing request 502.

The audio channels downstream of the PR feature module cannot be used to communicate with the caller, but they may be used in other ways. In one embodiment, the audio channels downstream of the PR feature module are used to receive an Answer Confirm (AC) feature. For example, if the target of one of the requests is a cell phone with an answering machine, and the cell phone is turned off, then the cell phone's answering machine answers the request immediately. This causes the PR feature module to abort the other requests immediately, so that there is no chance of reaching the person. If the target address subscribes to the AC feature, when the AC feature receives success from downstream, it enters state C. In this state, the AC feature module may use an audio interface downstream to announce to the callee to confirm that the user is reached. For example, the announcement may be "This is a call for John Doe. Please press 1 to accept the call." If the AC feature module receives the correct touch-tone, it sends "i!success" and enters state D. Only a person may enter the tone, so the AC feature module distinguishes requests accepted by an answering machine versus by a person and causes requests answered by a machine to fail or time out.

When a feature module is in state E, it is the permanent audio endpoint of the chain, and there are no downstream modules. If a feature module is in state E, then all upstream feature modules are in states B, C, or D, and at most one of them is in state C. B and D are audio-transparent states, so they do not contend with the module in state E. The answer confirm (AC) example illustrates that a C/E combination is not a case of audio contention, but rather a legitimate situation in which the module in state C is using the audio channel to communicate with the audio endpoint of the chain.

The meta-program 400 may be further refined for any feature module that follows the convention. The examples below illustrate the many ways in which the meta-program 400 may be refined.

The Do Not Disturb (DND) feature module described above is enabled by a subscriber data. The announcements and prompts mentioned there all occur when the DND program is in state A of the meta-program. If the call is urgent, DND continues it by sending o!request, entering state B, and going transparent.

Transparent behavior is a refinement of the meta-program. From state B, if a transparent program receives a success signal from downstream, it propagates the signal upstream, and enters state D. From state B, if a transparent program receives a failure signal from downstream, it propagates failure upstream, and terminates.

If the incoming call is not urgent, DND (in state A) sends "i!failure" and terminates. Because of the highly modular nature of the current method, the failure is handled by a different feature module, e.g., a Record Voice Mail (RVM) described below.

Call Forwarding on Request (CFR), described earlier, also does all its work in state A, then sends the forwarding address in "o!request". CFR could be combined in the same feature module with Call Forwarding on Failure (CFF), in which case it might have an active phase on a second visit to A after "o?failure". This phase may use a database query rather than a caller choice to determine the forwarding address. Again, the forwarding address would be sent in the request causing a transition from state A to state B.

As a refinement of the meta-program, a Collect Call (CC) feature module would interact with the caller in state A, e.g., to record the caller's name. In state C the feature module would interact with the callee, e.g., playing the recorded name, and asking for permission to bill the call to the callee. If the callee accepts, the feature module sends "i!success" and proceeds to transparency. If the callee refuses, the feature module sends "o!end" and returns to state A. Once in state A, the feature module may inform the caller that the callee has refused, and finally send "i!failure".

A No-Answer Time-Out (NATO) feature module generates a time-out so that a request is guaranteed to yield an outcome after a bounded amount of time. It does not use the audio channel. As a refinement of the meta-program, it does nothing in state A except to set the timer and continue the request. If there is a time-out in state B, the module sends "o!end" and "i!failure", then terminates. If the module receives an outcome before a time-out, it becomes transparent.

As a refinement of the meta-program, an endpoint device feature module playing the caller role receives a user request "i?request" through the hardware. It may generate dialtone on its first visit to state A, and busytone or errortone on a subsequent visit to A if the request fails. If it is generating busytone or errortone, receiving "i?end" from the user through the hardware will turn off the tone.

Record Voice Mail (RVM) is a familiar feature that is triggered by the failure of its continuation request, and that provides a good substitute for reaching its subscriber by offering to record a voice message. Thus, RVM turns failure into success. On receiving "o?failure" in state B, an RVM program passes instantly through A, sends "i!success", and goes to state E.

Note that a feature module in state B may monitor the audio channel, provided that it does not interfere with end-to-end audio communication. For example, a Sequential Find Me (SFM) feature may sequence through outgoing requests to a list of addresses, attempting to reach the intended callee. It may allow the caller to abort any particular attempt because it is alerting too long or is otherwise unpromising. The feature module would do this, in state B, by monitoring the audio channel from the caller for a touch-tone signal to abort. If the signal arrives, then the feature module sends "o!end" and returns to state A to make another attempt. In the same way, a feature module can monitor the audio channel in state D.

As a refinement of the meta-program, an endpoint-device feature module playing the callee role is a slight exception. It generates both alerting and ringback in state B. To make it fit the meta-program, one must imagine that the alerting bell is just downstream of the feature module, and that ringback is heard upstream because the feature module is audio-transparent in state B, and ringback is the same sound as alerting. It is safe to bend the rules in this way because we know that there are no feature modules between the endpoint device feature module and the imaginary bell.

In one embodiment, cases of audio contention may be eliminated by conferencing. For example, mixing audio sources allows several to be heard simultaneously. Consider, for example, a feature module that for some reason must use the audio channel in state B. If it forms a three-way conference with i, o and its audio-processing resource, then the audio channels of i and o may still be regarded as transparently connected.

In one embodiment, the current method also enables a feature module in state D to send or receive a second request. The call set up by this request may be referred to as an added call. If a feature module receives a second request while in any state other than state D, the feature module rejects the request. An example of a feature that receives an incoming second request is Call Waiting (CW). Examples of features that add calls are C2D and 3WC, which were described earlier.

Another example of a feature that adds calls is Sequential Credit-Card Calling (SCCC). This feature prompts the caller to enter credit-card information. Then the user may make a sequence of calls charged to the same account, without re-entering information. SCCC may seem very similar to Sequential Find Me (SFM), which also makes a sequence of continuation requests, even though the requests of SFM are not considered to be "added calls." The difference is that all the continuation requests of SFM are made for the purpose of helping its incoming request to succeed, and once one continuation request has succeeded, it makes no others. SCCC, on the other hand, can make any number of successful continuation requests.

Figure 6:
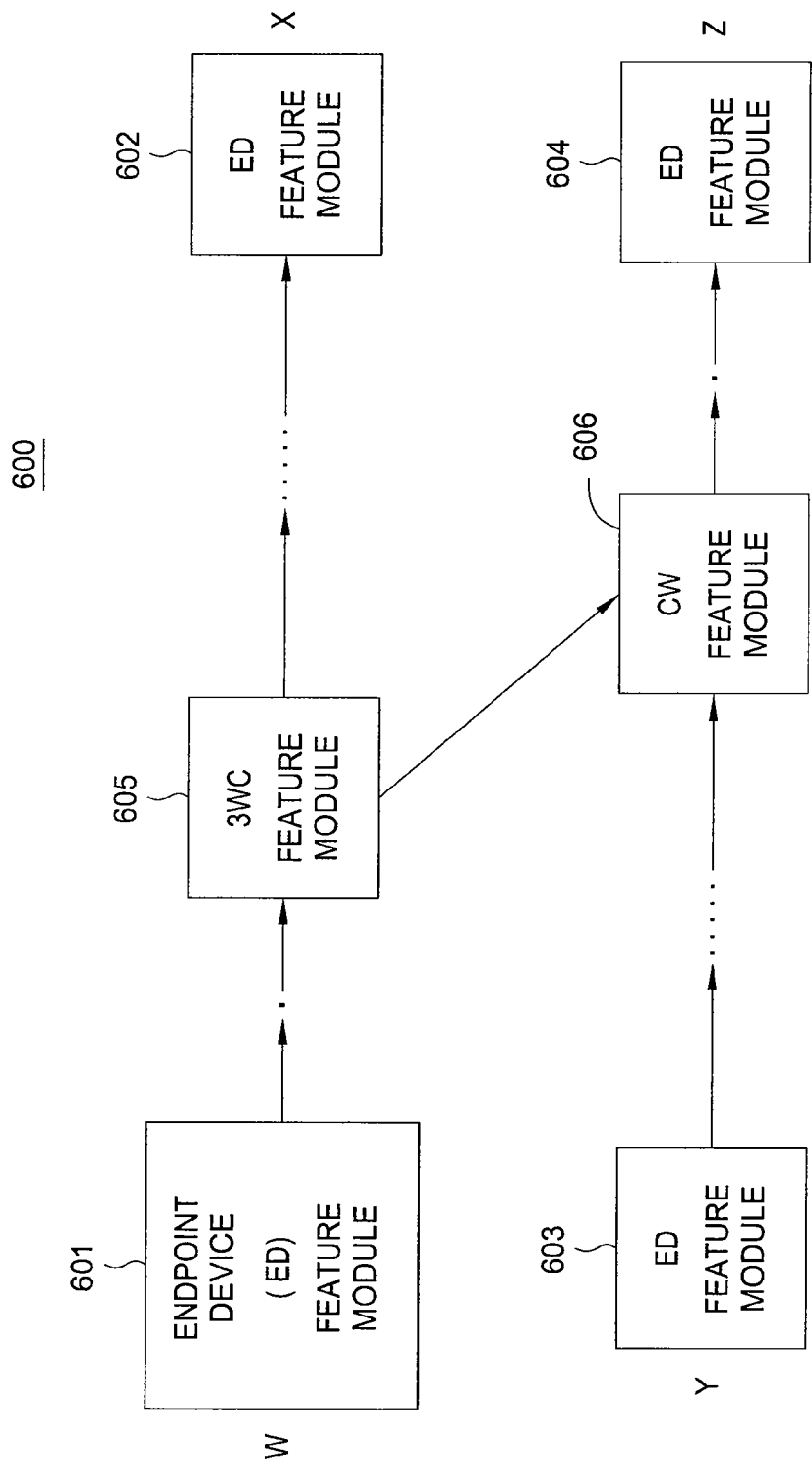
FIG. 6 provides an illustration of a feature module adding a call.

FIG. 6 provides an illustration 600 of a feature module adding a call. For example, users W, X, Y and Z have Endpoint Device (ED) feature modules 601, 602, 603, and 604, respectively. User W is already talking to user X. User Y is already talking to user Z. User W subscribes to 3WC feature provided by feature module 605. User Z subscribes to CW feature provided by feature module 606. User W is using the 3WC feature module 605 to call user Z through the CW feature module 606. There may be other feature modules, implicitly, in any of the paths. Note that due to the presence of added calls, a feature module may have signaling channels to three or more endpoints. This provides an opportunity for switching or conferencing the audio channels for the multiple calls.

The structure described above for added calls makes providing reversed or sequential progress tones straightforward. Note that reversed or sequential progress tones are necessitated by added calls as described earlier. For example, the 3WC feature module 605 subscribed to by user W acts like a caller endpoint feature module, generating any tones needed to be heard by user W. It also connects the audio channel of the added call to its user W when appropriate. Similarly, the CW feature module 606 subscribed to by user Z acts like a callee endpoint feature module, generating any tones needed to be heard by user Z. It also connects the audio channel of the added call to its user Z when appropriate.

Tone generation may be moved from the modules where the tone is specified (3WC and CW in the example) to any point between that module and the ears of the user. All one needs is a set of end-to-end signals indicating the beginning and ending of tones. In one embodiment, all tone generation would be implemented in endpoint devices, where it is most efficient. However, as noted earlier, the infrastructure does not always support reversed or sequential tones. For example, SIP allows tone-generation signals in some circumstances and not in others.

In one embodiment, the current method uses two distinct sets of tone-generation signals: a set standardized in SIP, and a set for managing audio contention. The set used for audio contention is sent in SIP info signals. Whenever possible, feature modules use the standardized SIP signals, so that tones may be generated by the endpoints. When this is not possible, feature modules may send the set of SIP signals provided in the current invention for managing audio contention. For example, every telephone may automatically subscribe to a Tone Generation (TG) feature module, which is placed in feature chains nearer to the endpoint devices than any other feature module. The TG feature module responds to the invented tone-generating signals, playing the tones on the audio channel toward its device.

Added calls introduce many new opportunities for audio contention. Each adding feature module needs, during the addition phase, a clear audio path to its subscriber. Three things might go wrong to interfere with the clear audio path, thus producing audio contention:

Some feature module between the adding module and its subscriber might be in state C;

Some feature module between the adding module and its subscriber might also be in the process of adding a call; or Feature modules that manage multiple parties, such as 3WC and CW, often perform switching of the audio channel.

The audio channel from the subscriber may have been switched away from the adding feature module in favor of the audio path to some other party. However, outgoing added calls do not occur at random times, but are added because of explicit commands from a subscriber. This makes it reasonable to assume that such actions may be sequenced and an enforcement of a sequence may be designed in the user interface.

The meta-program described above is a tool for understanding how to coordinate use of audio channels. It may be viewed as a specification that can be implemented in many different ways.

In one embodiment, the current method implements the call protocol in SIP. Most feature modules are Back-to-Back User Agents (B2BUAs), so that each signaling channel between two adjacent feature modules carries its own dialogue.

Figure 7:
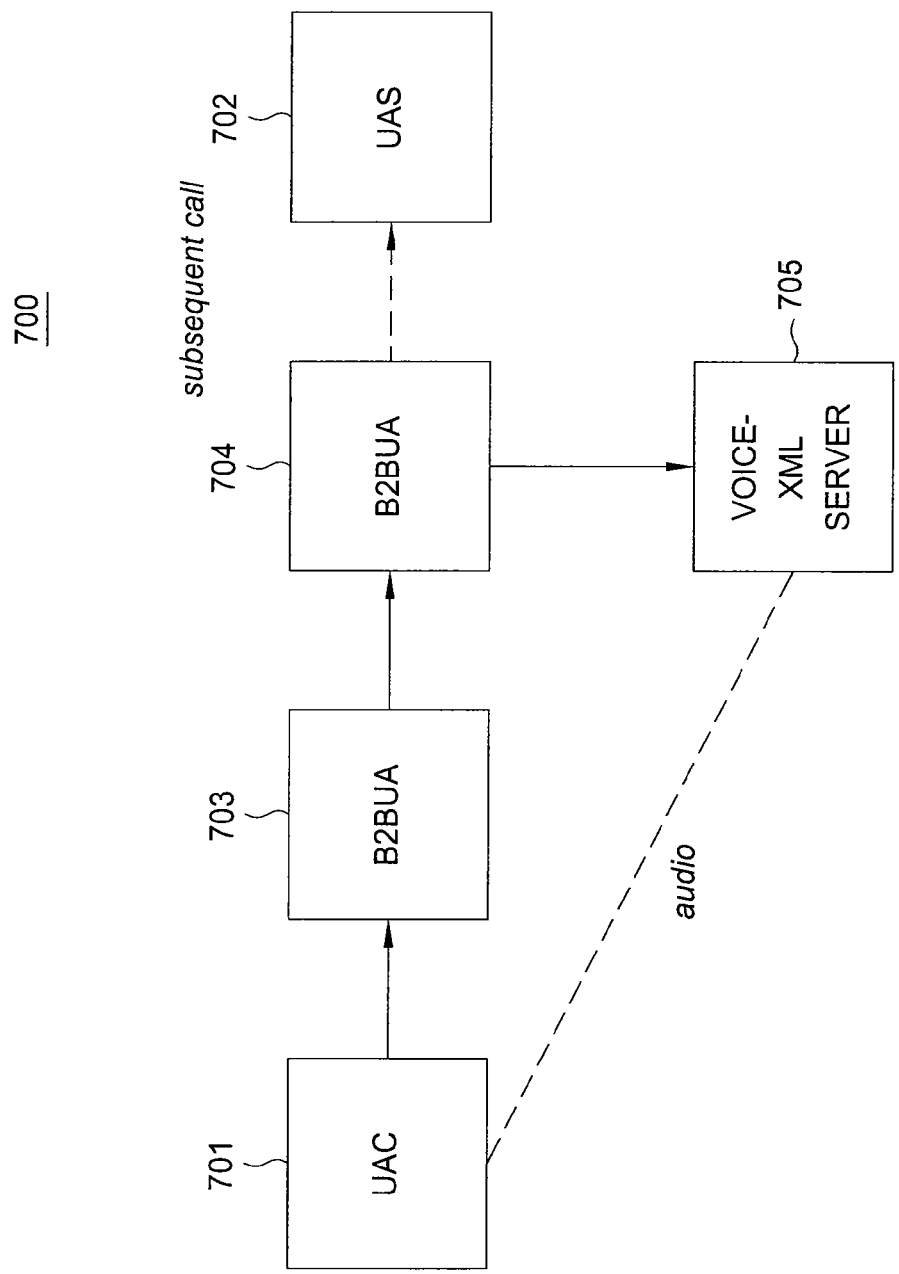
FIG. 7 illustrates an exemplary architecture for a SIP implementation.

FIG. 7 illustrates an exemplary architecture 700 for a SIP implementation. The exemplary architecture 700 comprises a User Agent Client (UAC) 701, a User Agent Server (UAS) 702, two B2BUAs 703 and 704, and a VoiceXML server 705. The UAC 701 is the caller and the UAS 702 is the callee. Recall that, whenever a feature module needs to perform media processing, it may make a call to a media server. In FIG. 7, the B2BUA 704 is in state A and it is interacting with the caller (UAC 701) through an interactive voice-response user interface. To perform the interaction with the caller, B2BUA 704 has placed a SIP call to the VoiceXML server 705 loaded with an appropriate script. B2BUA 704 coordinates the signals of its two calls so that an end-to-end audio channel is set up directly between the VoiceXML server 705 and the caller, UAC 701.

If the interaction with the caller is successful and B2BUA 704 proceeds to state B, then B2BUA 704 may end the call to the server and continue the incoming request to UAS 702 (callee). B2BUA 704 coordinates signals so that an end-to-end audio channel may be set up between the UAC 701 and UAS 702.

Figure 8:
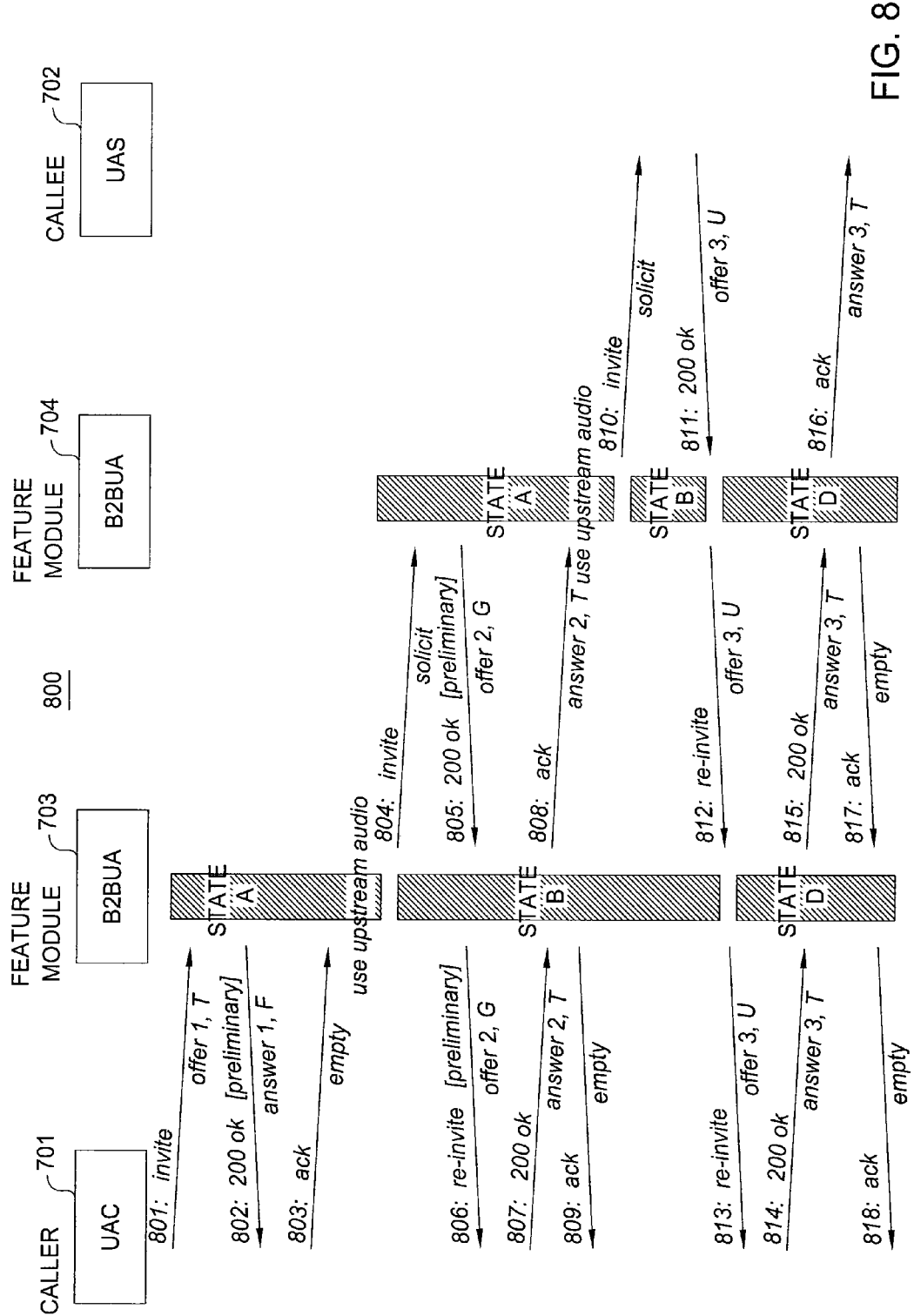
FIG. 8 illustrates a message-sequence chart for the SIP implementation.

In order to clearly understand how this coordination of signals is accomplished, the method for using an audio channel to the upstream end is first described. FIG. 8 illustrates a message-sequence chart 800 for the SIP implementation illustrated above. That is, FIG. 8 shows the signaling along the chain pictured in FIG. 7. The message-sequence chart also contains signals 801-816 for the flow. The configuration illustrates a feature module with an ordinary SIP client upstream, a feature module with an ordinary SIP client downstream, a feature module with a feature upstream, and a feature module with a feature downstream. In FIG. 8, a request eventually reaches end-to-end, as does a success response. At the end of the signal sequence, the caller (UAC 701) and the callee (UAS 702) are connected. However, on the way to this result, both B2BUAs 703 and 704 use the audio channel to the caller in state A of the meta-program. The figure shows the states of B2BUAs 703 and 704 at all times.

The label above each of the arrows for signals 801-816 shows the type of SIP signal and additional fields that are being used. The label below each of the arrows shows the session description contained in the signal, in an abbreviated form. It should be noted that the letters "T", "F", "U", and "G" represent media endpoints. For example, T is the caller 701. U is the callee, 702. F is the media server used by feature module 703. G is the media server used by feature module 704. In the real SIP protocol, these letters are the IP addresses of the media endpoints. It should be noted that these letters are applicable to both FIGS. 8 and 9. Offers and answers are numbered to show their correspondence. Both solicit and empty indicate no real session description, where an invite or re-invite without a session description is called solicit because it is soliciting an offer. Similarly, an acknowledgement (Ack) signal without a session description is merely empty. For offers and answers, the figure also shows explicitly the media endpoint represented by the signal.

The two feature modules B2BUAs 703 and 704 use media servers as in FIG. 7, but the media servers and the signaling with them are not shown in FIG. 8. When the feature modules 703 and 704 are used in signals to indicate media endpoints, they may actually refer to the corresponding media servers. For example, signal 801 is forwarded by B2BUA 703 to a media server. Signal 802 comes from the media server and is forwarded by B2BUA 703 to UAC 701, etc.

When a feature module receives a request by means of an invite, e.g., signals 801 and 804, it generates a 200 ok locally with the tag preliminary in an extra field to prepare for using the audio channel. For example, B2BUA 703 generates the 200 ok signal 802, with the preliminary tag. B2BUA 704 generates the 200 ok signal 805, with the preliminary tag. This preliminary tag is an extension to SIP. The tag has no meaning to a user agent, but it has a meaning to another feature module. Specifically, the tag indicates to another feature module that the signal is not an implementation of success in the meta-program. A 200 ok signal from a UAS will not have this tag, so it will be interpreted by a feature module as a success in the meta-program (e.g. signal 811). Signals 812 and 813 also implement success in the meta-program.

Those skilled in the art realize that the offers and answers are handled in the above description in a similar manner to third-party call control scenarios. That is, when a feature module is behaving transparently, it forwards offers and answers faithfully. Offers may travel in invite, re-invite or 200 ok signals. Answers may travel in 200 ok or ack signals. The transparent module may need to change the type of the signals in which an offer or an answer is traveling, to fit the state of the dialogue into which the signal may be sent. For example, B2BUA 703 is logically transparent from signal 804 onward. It changes a 200 ok with an offer to a re-invite with an offer (e.g. signals 805 and 806). It changes a 200 ok with an answer to an ack with an answer (e.g. signals 807 and 808). B2BUA 704 behaves similarly from signal 810 onward.

Figure 9:
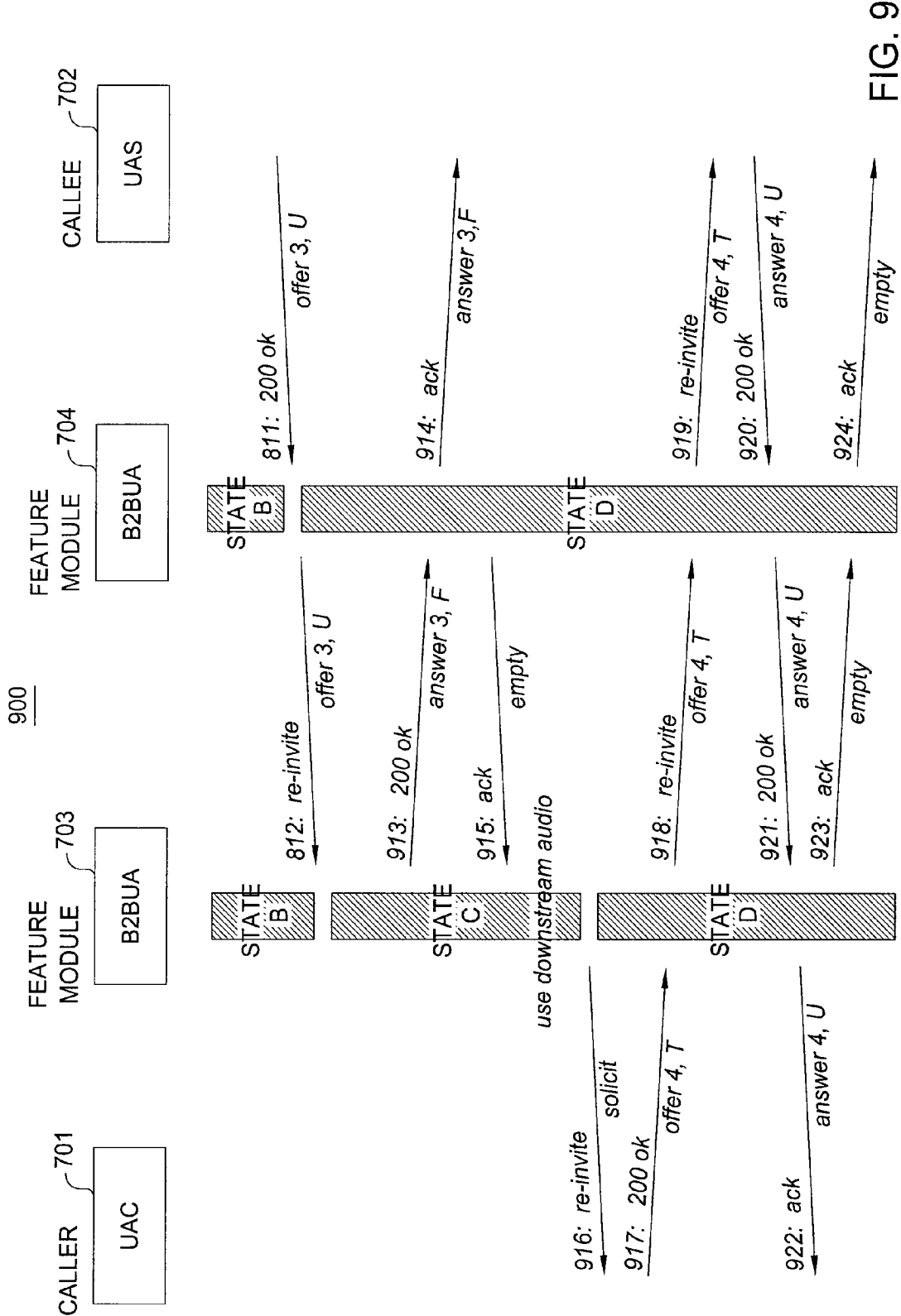
FIG. 9 illustrates an exemplary signaling for using the audio channel to the downstream end.

The pattern of signaling in FIG. 8 works regardless of how many feature modules in a chain wish to use the audio channel to the upstream end. FIG. 9 illustrates an exemplary signaling 900 for using the audio channel to the downstream end.

FIG. 9 continues after signal 812 of FIG. 8 in a different way. That is, signals 801-812 are used in FIG. 9 without any alteration. The signals after 812 are altered and the new signals are shown in FIG. 9 as 913-924. Signal 812 causes B2BUA 703 to enter state C of the meta-program to create an audio channel to the UAS 702. For example, the B2BUA 703 may wish to communicate with the callee and send the 200 ok signal, signal 913. The B2BUA 703 then uses the audio channel to communicate with the callee and then sends success towards the caller (UAC 701) in signal 916. As in FIG. 8, this pattern works regardless of how many feature modules in the chain wish to use the audio channel to the downstream end.

If a feature module needs to generate an upstream failure after it has already sent a preliminary 200 ok, then it simply sends bye. An upstream feature module that has not yet received a final 200 ok when it receives bye interprets the bye as a failure.

If a feature module receives 183 with a session description (early media) from downstream, then the feature module is in state B, and there is no problem with allowing a downstream module to use the audio channel. Depending on the state of the upstream dialogue, however, the transparent feature module may need to translate the 183 into a re-invite. SIP early media is not used in the basic implementation of the meta-program because it does not allow the final session description from downstream to differ from the preliminary session description. This makes it unsuitable for a chain of feature modules, each of which may have its own media server.

If a feature module receives 180 from downstream, it may not be able to forward the signal upstream, because of the state of the upstream dialogue. In this case, the feature module receiving the 180 may generate ringback upstream without fear of an audio contention.

Figure 10:
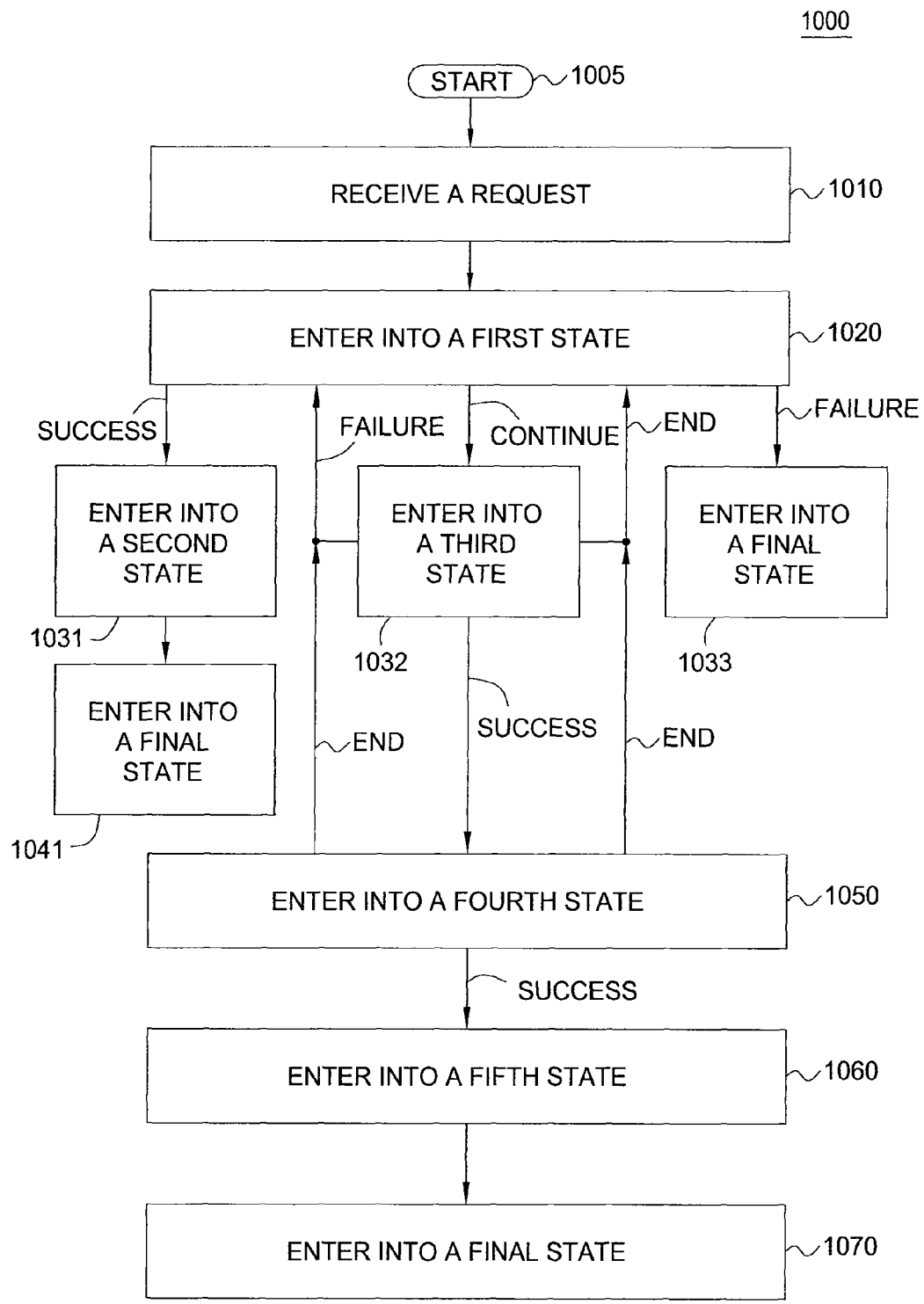
FIG. 10 illustrates a flowchart of the method of the current invention for managing audio contention.

FIG. 10 illustrates a flowchart of the method 1000 of the current invention for managing audio contention. For example, method 1000 can be implemented by an endpoint device and/or a feature module. For example, the feature module may provide one or more features such as but not limited to: Do Not Disturb (DND), Call Forwarding on Request (CFR), Call Forwarding on Failure (CFF), Collect Call (CC), No-Answer Time-Out (NATO), Record Voice Mail (RVM), Sequential Find Me (SFM), Call Waiting (CW), Click-to-Dial (C2D), Three-Way Calling (3WC), Sequential Credit Card Calling (SCCC), Tone Generation (TG), Parallel Ringing (PR), or Answer Confirm (AC). More specifically, method 1000 presents FIG. 4 in a flowchart format. Method 1000 starts in step 1005 and proceeds to step 1010.

In step 1010, method 1000 receives a request, e.g., a call request.

In step 1020, method 1000 enters into a first state, e.g., state A, where method 1000 has the ability to use the audio channel towards the upstream direction. Under this state, method 1000 has the ability to arrive to one of three (3) possible decisions or outcomes for the request. A first possible decision (e.g., failure outcome) is that method 1000 may determine that a "failure" response (sent in the upstream direction) should be provided in response to the request, e.g., a feature module may determine that the request cannot be serviced. A second possible decision (e.g., success outcome) is that method 1000 may determine that a "success" response (sent in the upstream direction) should be provided in response to the request, e.g., a feature module may determine that the request can be serviced. A third possible decision (e.g., continue outcome) is that method 1000 may determine that the request should simply be allowed to continue, e.g., to the next feature module, because a feature module may determine that the request is not intended for it to act on at this time. For example, the request is intended to be serviced by another feature module.

In step 1033, if the decision in step 1020 is that a failure response is to be sent, e.g., in the upstream direction, then method 1000 enters into a final state, e.g., where the request will not be serviced.

In step 1031, if the decision in step 1020 is that a success response is to be sent, e.g., in the upstream direction, then method 1000 enters into a second state (e.g., state E), where method 1000 has the ability to use the audio channel towards the upstream direction. In this second state, method 1000 has the ability to perform one or more functions to satisfy the request received in step 1010. Upon completion of one or more functions, method 1000 may send an "end" response, e.g., in the upstream direction and enters into a final state in step 1041.

In step 1032, if the decision in step 1020 is to continue, then method 1000 enters into a third state (e.g., state B), where method 1000 has no ability to use the audio channel, thereby causing method 1000 to be in an audio-transparent state (i.e., the upstream audio channel and the downstream audio channel are connected by the current feature module, but the current feature module will not interfere with the connected audio channels). For example, the request was intended for another feature module. As such, the request is simply passed along to the next feature module in a chain and a current feature module will remain quiet without the ability to access the audio channel.

Once method 1000 enters into the third state in step 1032, three possible events will cause method 1000 to exit the third state. In a first event, method 1000 receives a failure event, e.g., from a downstream direction, indicating that a failure response for the request has been generated by a device, e.g., another feature module, somewhere from the downstream direction. Namely, for some reasons, the request forwarded downstream cannot be serviced. Method 1000 then exits the third state and returns to the first state in step 1020. In a second event, method 1000 receives a success event, e.g., from a downstream direction, indicating that a success response for the request has been generated by a device, e.g., another feature module, somewhere from the downstream direction. Namely, the request sent downstream has been successfully serviced. Method 1000 then exits the third state and proceeds to step 1050. In a third event, method 1000 detects an end event, e.g., elapsed of a predefined time period, indicating that a success response or a failure response has not been received from the downstream direction even though the request previously received in step 1010 has been passed along downstream. Method 1000 then exits the third state and returns to the first state in step 1020.

In step 1050, method 1000 enters into a fourth state (e.g., state C), where method 1000 has the ability to use the audio channel towards the upstream direction, and has the ability to use the audio channel towards the downstream direction. However, under this fourth state, method 1000 cannot connect the upstream audio channel to the downstream audio channel (i.e., the upstream audio channel and the downstream audio channel will not be connected by the current feature module).

Once method 1000 enters into the fourth state in step 1050, three possible events will cause method 1000 to exit the fourth state. In a first event, method 1000 decides to generate an end event, e.g., elapsed of a predefined time period, indicating that although a previous success response has been received from the downstream direction, the processing of the request is simply taking too long and method 1000 decides to end the request. Method 1000 then exits the fourth state and returns to the first state in step 1020. In a second event, method 1000 detects an end event, e.g., from the downstream direction, indicating that although a previous success response has been received from the downstream direction, the processing of the request is simply taking too long for a device or the called party somewhere downstream and that device has timed out or the called party has abandoned the call and caused an end response to be generated. Upon receiving this end response, method 1000 then exits the fourth state and returns to the first state in step 1020. In a third event, method 1000 determines that a success response should be sent in the upstream direction and method 1000 proceeds to step 1060.

In step 1060, method 1000 enters into a fifth state (e.g., state D), where method 1000 has no ability to use the audio channel, thereby causing method 1000 to be in an audio-transparent state (i.e., the upstream audio channel and the downstream audio channel are connected by the current feature module, but the current feature module will not interfere with the connected audio channels). Generally, at this state (e.g., a talking state), the call request had been serviced such that the calling party is currently communicating with the called party. Once method 1000 enters into the fifth state in step 1060, two possible events will cause method 1000 to exit the fifth state. In a first event, method 1000 detects an end event, e.g., from the downstream direction, indicating that a called party has ended the call. Upon receiving this end response, method 1000 then exits the fifth state and enters a final state in step 1070. In a second event, method 1000 detects an end event, e.g., from the upstream direction, indicating that a calling party has ended the call. Upon receiving this end response, method 1000 then exits the fifth state and enters a final state in step 1070. In one embodiment, it should be noted that if the end response is received from the downstream direction, the end response is propagated towards the upstream direction and vice versa.

It should be noted that although not specifically specified, one or more steps of method 1000 may include a storing, displaying and/or outputting step as required for a particular application. In other words, any data, records, fields, and/or intermediate results discussed in the method 1000 can be stored, displayed and/or outputted to another device as required for a particular application. Furthermore, steps or blocks in FIG. 10 that recite a determining operation, or involve a decision, do not necessarily require that both branches of the determining operation be practiced. In other words, one of the branches of the determining operation can be deemed as an optional step.

Figure 11:
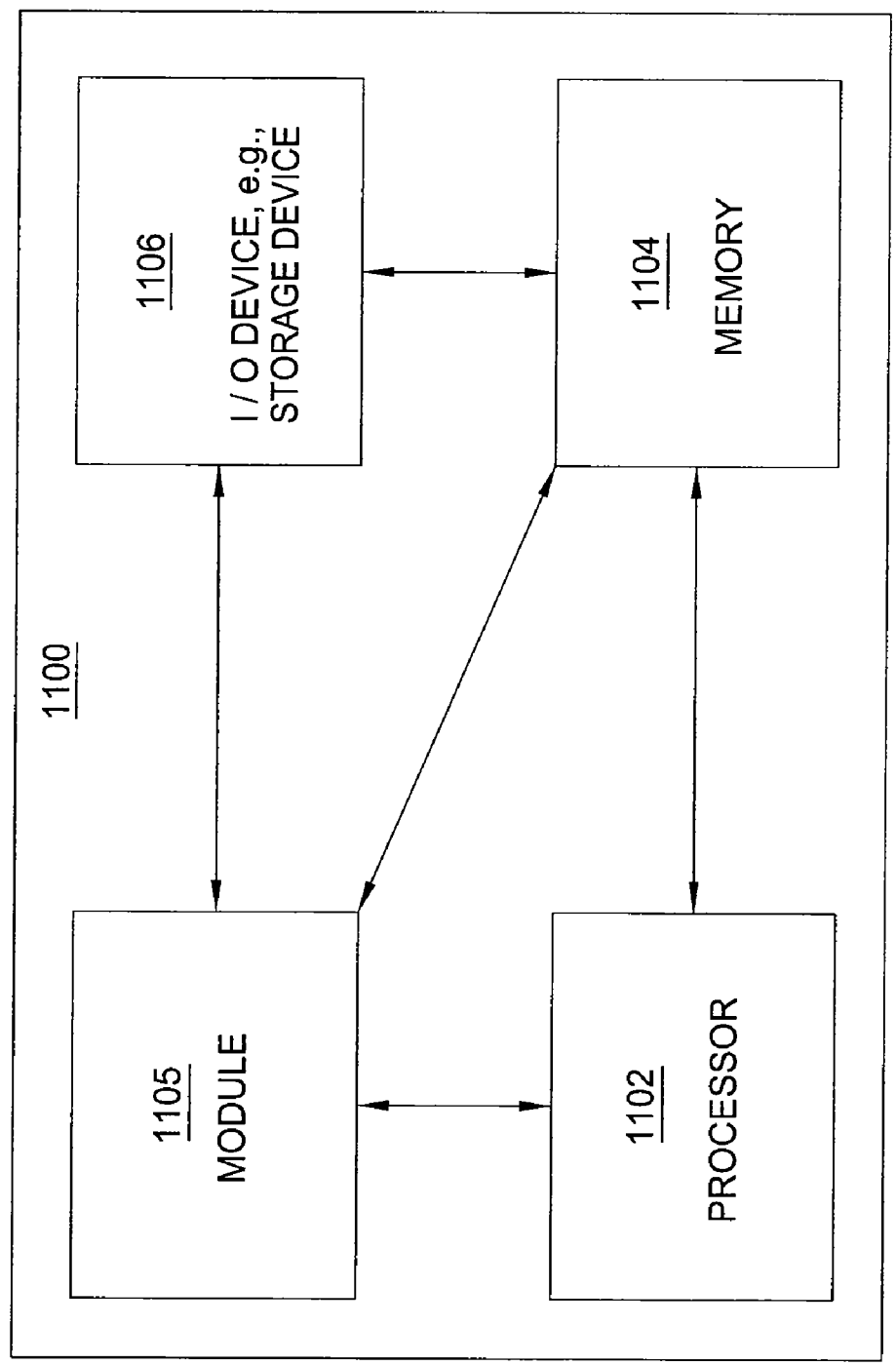
FIG. 11 illustrates a high-level block diagram of a general-purpose computer suitable for use in performing the functions described herein.

FIG. 11 depicts a high-level block diagram of a general-purpose computer suitable for use in performing the functions described herein. As depicted in FIG. 11, the system 1100 comprises a processor element 1102 (e.g., a CPU), a memory 1104, e.g., random access memory (RAM) and/or read only memory (ROM), a module 1105 for managing audio contention, and various input/output devices 1106 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 1105 for managing audio contention can be loaded into memory 1104 and executed by processor 1102 to implement the functions as discussed above. As such, the present method 1105 for managing audio contention (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for managing audio contention, comprising:
   receiving a request by a device, wherein the device comprises a feature module;
   entering into a first state by the device, wherein the first state allows the device to use an audio channel in an upstream direction, wherein the device in the first state determines an outcome selected from one of: a failure outcome for the request, a success outcome for the request, and a continue outcome for the request;
   forwarding the request in a downstream direction if the continue outcome is determined by the device;
   entering into a third state, wherein the third state causes the device to enter into an audio-transparent state, wherein the audio-transparent state is a state in which the device does not contend for the audio channel; and
   causing the device to enter into a fourth state upon detecting a success event, wherein the fourth state allows the device to use the audio channel in the upstream direction, wherein the fourth state allows the device to use the audio channel in the downstream direction, wherein the fourth state disallows the device from connecting an upstream channel to a downstream channel.

2. The method of claim 1, further comprising:
   causing the device to return to the first state upon detecting an end event.

3. The method of claim 1, further comprising:
   causing the device to enter into a fifth state upon detecting a success event, wherein the fifth state causes the device to enter into an audio-transparent state, wherein the audio-transparent state is a state in which the device does not contend for the audio channel.

4. The method of claim 3, further comprising:
   causing the device to enter into a final state upon detecting an end event.

5. A non-transitory computer-readable medium having stored thereon a plurality of instructions, the plurality of instructions including instructions which, when executed by a processor, cause the processor to perform a method for managing audio contention, comprising:
   receiving a request by a device, wherein the device comprises a feature module; and
   entering into a first state by the device, wherein the first state allows the device to use an audio channel in an upstream direction, wherein the device in the first state determines an outcome selected from one of: a failure outcome for the request, a success outcome for the request and a continue outcome for the request;
   forwarding the request in a downstream direction if the continue outcome is determined by the device;
   entering into a third state, wherein the third state causes the device to enter into an audio-transparent state, wherein the audio-transparent state is a state in which the device does not contend for the audio channel; and causing the device to enter into a fourth state upon detecting a success event, wherein the fourth state allows the device to use the audio channel in the upstream direction, wherein the fourth state allows the device to use the audio channel in the downstream direction, wherein the fourth state disallows the device from connecting an upstream channel to a downstream channel.

6. The non-transitory computer-readable medium of claim 5, further comprising:
causing the device to return to the first state upon detecting an end event.

7. The non-transitory computer-readable medium of claim 5, further comprising:
causing the device to enter into a fifth state upon detecting a success event, wherein the fifth state causes the device to enter into an audio-transparent state, wherein the audio-transparent state is a state in which the device does not contend for the audio channel.

8. The non-transitory computer-readable medium of claim 7, further comprising:
causing the device to enter into a final state upon detecting an end event.

9. An apparatus for managing audio contention, comprising:
a device comprising a processor, and a computer-readable medium in communication with the processor, wherein the computer-readable medium having stored thereon a plurality of instructions, the plurality of instructions including instructions which, when executed by the processor, cause the processor to perform a method, comprising:
receiving a request, wherein the device comprises a feature module; and
entering into a first state, wherein the first state allows the device to use an audio channel in an upstream direction, wherein the device in the first state determines an outcome selected from one of: a failure outcome for the request, a success outcome for the request and a continue outcome for the request;
forwarding the request in a downstream direction if the continue outcome is determined by the device;
entering into a third state, wherein the third state causes the device to enter into an audio-transparent state, wherein the audio-transparent state is a state in which the device does not contend for the audio channel; and
causing the device to enter into a fourth state upon detecting a success event, wherein the fourth state allows the device to use the audio channel in the upstream direction, wherein the fourth state allows the device to use the audio channel in the downstream direction, wherein the fourth state disallows the device from connecting an upstream channel to a downstream channel.

10. The apparatus of claim 9, further comprising:
causing the device to return to the first state upon detecting an end event.

11. The apparatus of claim 9, further comprising:
causing the device to enter into a fifth state upon detecting a success event, wherein the fifth state causes the device to enter into an audio-transparent state, wherein the audio-transparent state is a state in which the device does not contend for the audio channel.

12. The apparatus of claim 11, further comprising:
causing the device to enter into a final state upon detecting an end event.

* * * * *